United States Patent [19]

Matthews

[11] Patent Number: 6,057,827
[45] Date of Patent: May 2, 2000

[54] AUTOMATIC POINTER POSITIONING FOR 3D COMPUTER MODELING

[75] Inventor: Kevin Matthews, Eugene, Oreg.

[73] Assignee: Artifice, Inc., Eugene, Oreg.

[21] Appl. No.: 08/820,956

[22] Filed: Mar. 19, 1997

Related U.S. Application Data

[63] Continuation of application No. 08/633,219, Apr. 16, 1996, abandoned, which is a continuation of application No. 08/080,655, Jun. 18, 1993, abandoned.

[51] Int. Cl.$^7$ .................................................. G06F 3/033
[52] U.S. Cl. ............................................................ 345/145
[58] Field of Search ................................... 395/119, 120, 395/121, 125, 129, 141, 133; 345/145, 419, 420, 421, 425, 429, 433, 441

[56] References Cited

U.S. PATENT DOCUMENTS

| | | | |
|---|---|---|---|
| 4,835,528 | 5/1989 | Flinchbaugh | 345/159 |
| 5,010,502 | 4/1991 | Diebel et al. | 395/119 |
| 5,103,217 | 4/1992 | Cawley | 395/129 |
| 5,177,474 | 1/1993 | Kadota | 345/139 |
| 5,264,836 | 11/1993 | Rubin | 345/157 |
| 5,278,983 | 1/1994 | Kawabe et al. | 395/120 |
| 5,490,241 | 2/1996 | Mallgren et al. | 395/141 X |

OTHER PUBLICATIONS

Swivel 3D Professional User's Guide; Paracomp, Inc.; 1987–1990 San Francisco, CA, U.S.; pp. 3–1 to 3–9; 4–1 to 4–16; 5–8 to 5–11; 14–1 to 14–5.

Snap–Dragging: Interactive Geometric Design in Two and Three Dimensions, Eric A. Bier; University of California, Mar., 1988.

*Primary Examiner*—Mark K. Zimmerman
*Attorney, Agent, or Firm*—Klarquist Sparkman Campbell Leigh & Whinston, LLP

[57] ABSTRACT

In a computer graphics modeling system, a method for accurately positioning a cursor on a geometric point of a three dimensional object (such as an object vertex) shown in a two dimensional projected view. The system monitors the position of a movable pointer on a two dimensional projected view of the three dimensional object. When the user desires to accurately position the cursor on the object, the user signals the system via an input device or other means. The system receives the signal, which indicates that the pointer is preliminarily aligned with a geometric point on the object. In response to the signal, the system determines the position of a nearest geometric point to the pointer and moves the pointer to the spatial coordinates of the point's position. To aid in identifying geometric points, they are visibly different in the projected view from non-geometric points. In another embodiment, the cursor is positioned in three dimensions by computing the coordinates of a three dimensional point on an object surface which coincides in two dimensions with the coordinates of the pointer. The three dimensional coordinates of the pointer are then reset to the three dimensional coordinates of the object point.

9 Claims, 5 Drawing Sheets

3D POINTER (CROSSHAIR) BEFORE SPACE-JUMP
3D POINTER, AT (-1.5, 1.0, 0.0)
EXAMPLE OBJECT, BASE HEIGHT 8.5 UNITS
POINTER POSITION READOUT

3D POINTER (CROSSHAIR) AFTER SPACE-JUMP
EXAMPLE OBJECT, BASE HEIGHT 8.5 UNITS
3D POINTER, AT (-1.5, 1.0, 8.5)
POINTER POSITION READOUT

FIG. 1. 3D POINTER (CROSSHAIR) FREE IN MODELING SPACE
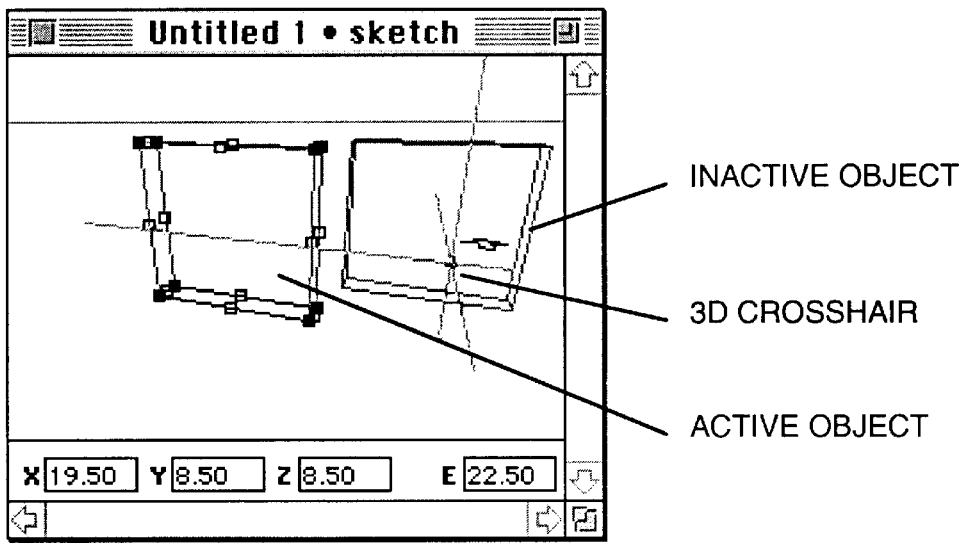
FIG. 2. DYNAMIC SURFACE POINTER IN OBJECT FACE
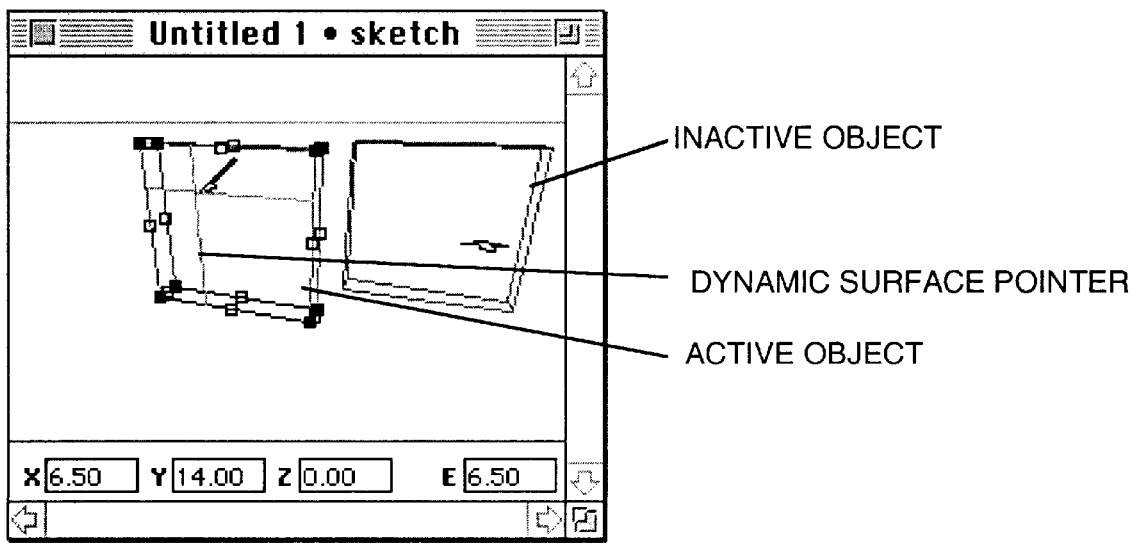

FIG. 3. DYNAMIC SURFACE POINTER BEING USED FOR TRIM FUNCTION
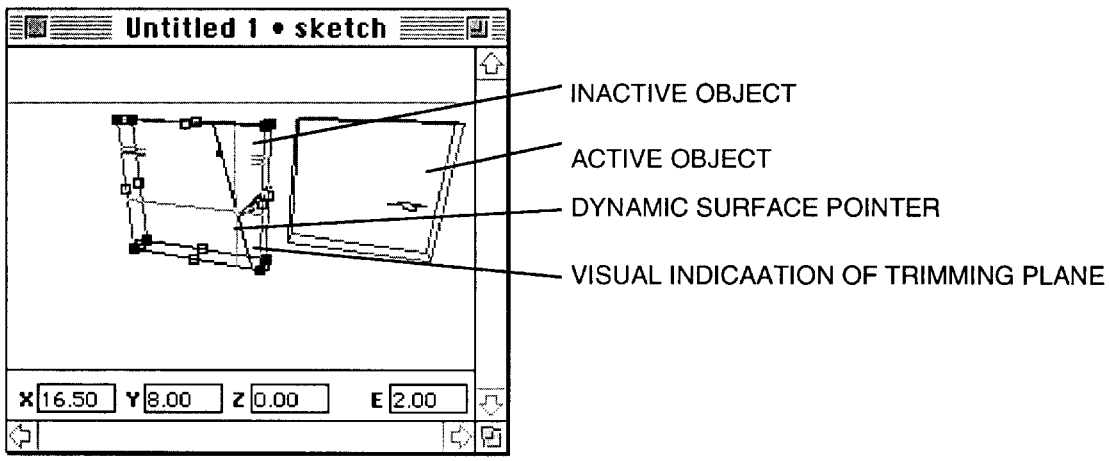
FIG. 4. DYNAMIC SURFACE POINTER BEING USED FOR INTERACTIVE BOOLEAN OPERATION
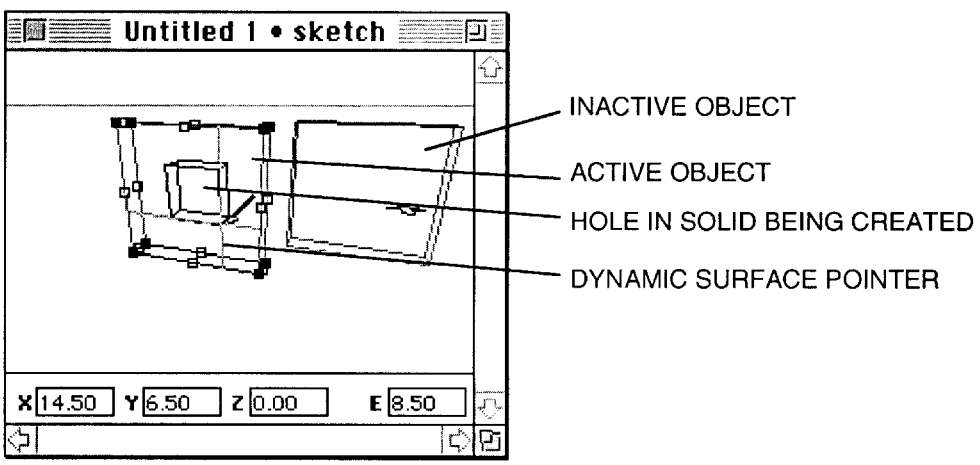

FIG. 5. 3D POINTER (CROSSHAIR) BEFORE SPACE-JUMP
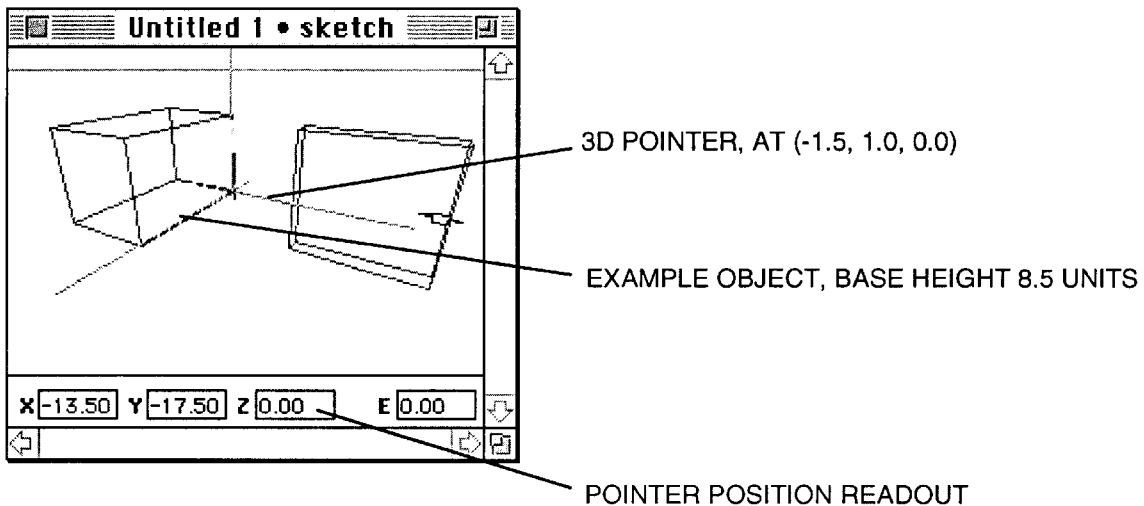
FIG. 6. 3D POINTER (CROSSHAIR) AFTER SPACE-JUMP
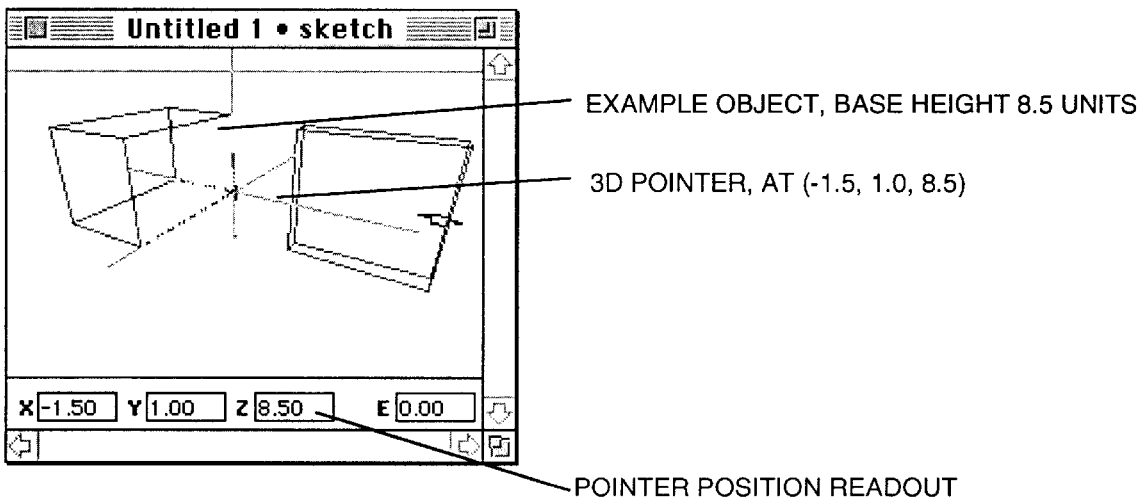

FIG. 7. 3D POINTER (CROSSHAIR) BEFORE SPACE-JUMP, WITH PROJECTION LINES
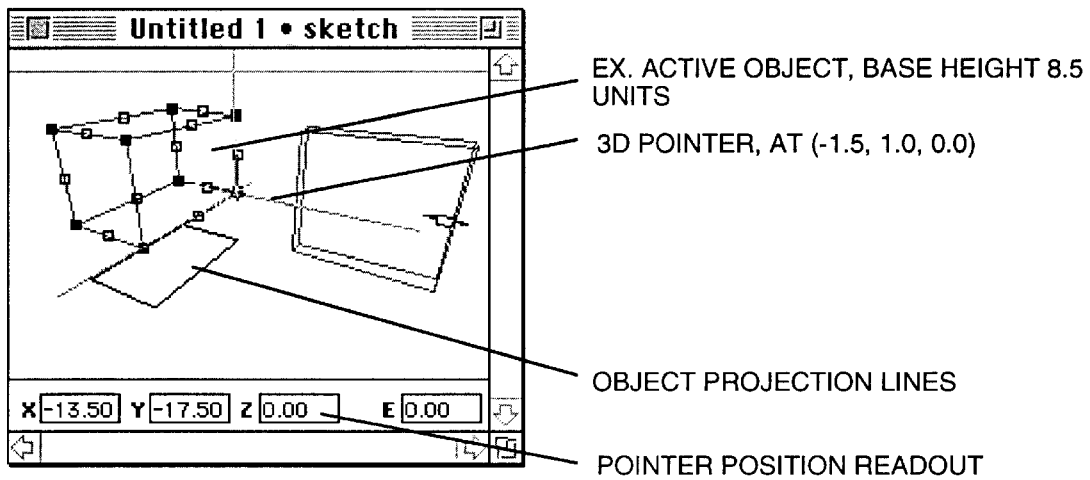
FIG. 8. 3D POINTER (CROSSHAIR) AFTER SPACE-JUMP, WITH PROJECTION LINES
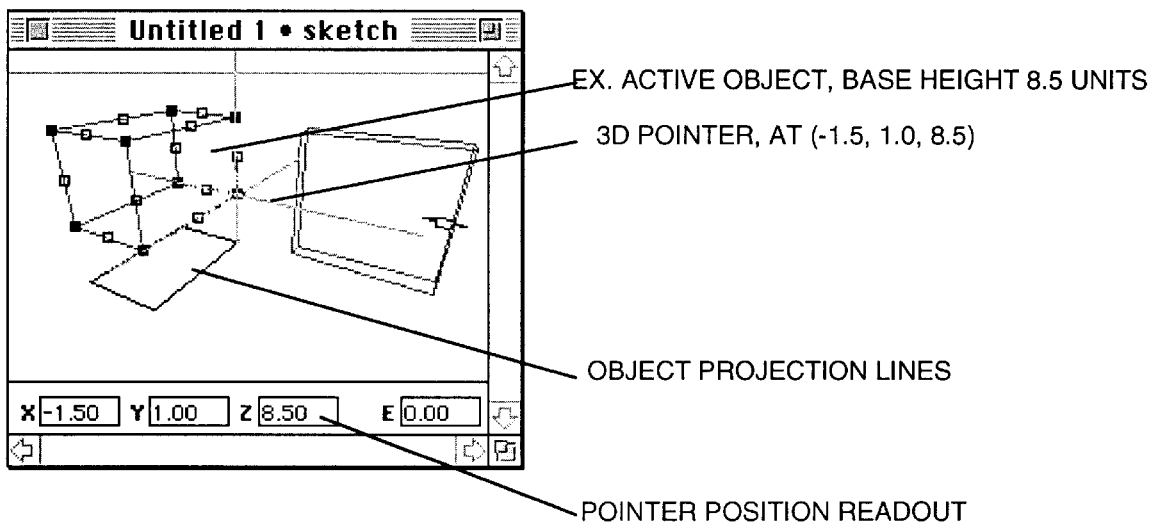

FIG. 9. 3D POINTER COORDINATE SYSTEM TRACKING WITH SURFACE POINTER
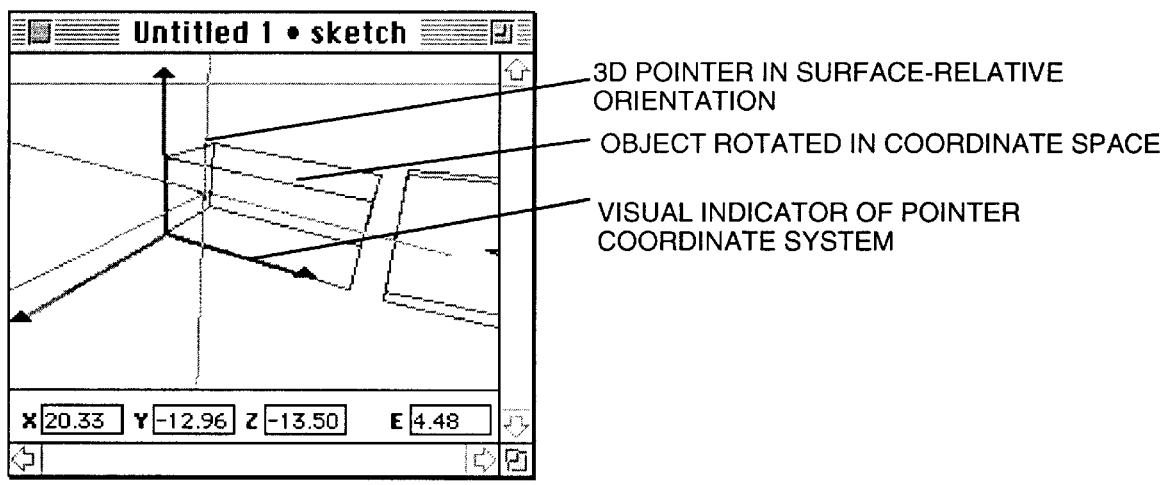

AUTOMATIC POINTER POSITIONING FOR 3D COMPUTER MODELING

RELATED APPLICATION DATA

This application is a continuation of application Ser. No. 08/633,219, filed on Apr. 16, 1996, now abandoned, which is a continuation of application Ser. No. 08/080,655, filed Jun. 18, 1993, now abandoned.

FIELD OF THE INVENTION

This invention relates generally to interactive processes for the construction of three-dimensional computer models. More particularly, this invention is applicable to solids and feature-based modeling using boolean or similar operations to describe complex forms.

BACKGROUND AND SUMMARY OF THE INVENTION

Construction of three-dimensional computer models has become a valuable part of the design, construction, and manufacturing process in many fields. The efficiency of the modeling process has been restricted by the difficulty of accurately positioning modeling tools and model objects in three-dimensional space. This invention provides a set of methods for fast, accurate positioning of tools and objects in model space. These methods provide a novel economy of steps to accomplish key functions.

The space-jump, which is one aspect of the invention, provides instant rendezvous of a three dimensional (3D) pointer with a distant location in space. The dynamic surface pointer, another aspect of the invention, automatically positions a 3D pointer in space relative to active objects. This automatic positioning provides very efficient performance of certain modeling tasks, including but not limited to cutting, 3D image-positioning, and feature-based or traditional boolean operations.

In accordance with the invention, therefore, a method is shown and described for accurately positioning a cursor on a geometric point of a three dimensional object (such as an object vertex) shown in a two dimensional projected view. The system monitors the position of the movable pointer on a two dimensional projected view of the three dimensional object. When the user desires to accurately position the cursor on the object, the user signals the system via an input device or other means. The system receives the signal, which indicates that the pointer is preliminarily aligned with a geometric point on the object. In response to the signal, the system determines the position of a nearest geometric point to the pointer and moves the pointer to the spatial coordinates of the point's position. To aid in identifying geometric points, they are visibly different in the projected view from non-geometric points.

In another embodiment of the invention, the cursor is positioned in three dimensions by computing the coordinates of a three dimensional point on an object surface which coincides in two dimensions with the coordinates of the pointer. The three dimensional coordinates of the pointer are then reset to the three dimensional coordinates of the object point.

The foregoing and other objects, features, and advantages of the invention will become more apparent from the following detailed description of a preferred embodiment and the accompanying drawings.

BRIEF DESCRIPTION OF THE DRAWINGS

FIG. 1 is a diagram showing a 3D pointer (cross hair) according to the invention free in modeling space.

FIG. 2 is a diagram showing a dynamic surface pointer according to the invention in object face.

FIG. 3 is a diagram showing the dynamic surface pointer being used for a trim function.

FIG. 4 is a diagram showing the dynamic surface pointer being used for an interactive boolean operation.

FIG. 5 is a diagram showing the 3D pointer (cross hair) before space-jump.

FIG. 6 is a diagram showing the 3D pointer (cross hair) after space-jump.

FIG. 7 is a diagram showing the 3D pointer (cross hair) before space-jump, with projection lines.

FIG. 8 is a diagram showing the 3D pointer (cross hair) after space-jump, with projection lines.

FIG. 9 is a diagram showing the 3D pointer coordinate system tracking with surface pointer.

DETAILED DESCRIPTION OF PREFERRED EMBODIMENTS

The invention constitutes a significant enhancement to a direct-manipulation three-dimensional (3D) computer modeling environment. In some such modeling environments, a position indicator such as a cross hair or similar 3D pointer is moved freely in 3D model space in a variety of modes to create, transform, and edit objects.

The invention provides fast, accurate 3D alignments of the pointer to geometric, or hot, points of an object by a method referred to herein as a "space-jump." Geometric points are points in a set of interest and can include object corners or vertices, mid-points of object edges or faces, or other selected points on or in an object. The geometric points are visually indicated, for instance by being drawn in a different color from the rest of the object or in a contrasting shape.

The space-jump method is performed by aligning the pointer so that it is two-dimensionally co-incident in the projected view with an object geometric point. Then the space-jump is executed by a user signal, such as typing a single keystroke (the space-bar, for instance). The pointer is automatically moved forward or backward along a line of coincidence so that it coincides three-dimensionally with the geometric point.

The invention provides an "automatic faces cross hair" to provide automatic alignments to the surface planes of a 3D object. This functions such that in certain pre-defined operating modes (for example, trimming or cutting openings in a solid), when the three-dimensional pointer appears in front of an appropriate object it becomes automatically constrained to the front faces of the object. The appropriateness of an object for faces cross hair display can be indicated by user selection, or by automatic inference based on object characteristics.

In this way, the pointer or cross hair is temporarily and contextually constrained to two dimensions in the object coordinate system. This coordinate system may be the same as the viewing coordinate system, as in an orthographic projection, or it may be two dimensions independent of the picture plane, as in a three-point perspective projection. This coordinate system allows surface-relative positional indication which is most suitable for some modeling operations.

For example, in a trimming or cutting mode, drawing a two-dimensional (2D) line on the object surface can indicate a cutting plane to slice through an object. The line is taken together with a preset or user-input angle to the surface to define the cutting plane. Another application of the faces cross hair is to define object features, such as holes through solids. For instance, dragging a rectangle on the surface of the object can indicate the outline of a four-sided hole feature to be projected through the object or the profile of another object or boss feature to be projected outward from the object, or simply surface details of the object itself.

Space-jump

A space-jump method, in accordance with the invention, is illustrated in FIGS. 5–8. When the user signals, an object geometric spot is identified by 2D co-incidence (FIG. 5), and then the pointer is moved to the 3D position of that geometric-spot (FIG. 6). The space-jump can be implemented equally well using any of several well-known position-detection algorithms. Any algorithm which provides appropriate position detection can support the functionality of the invention.

For example, the projected coordinates of geometric spots can be mathematically compared to the 2D screen location of the pointer to identify any object geometric spots within a certain tolerance. Ray-casting or other methods can also be used to identify the geometric spot. The geometric spot is chosen which is nearest the viewer, or which meets other automatically or semi-automatically indicated positional or attribute criteria. The 3D coordinates of the geometric spot are then used for the new position of the 3D pointer.

Dynamic surface-pointer

A dynamic surface pointer in accordance with the invention is illustrated in FIGS. 1–4. FIG. 1 shows the pointer unconstrained by an active object on the display. When the modeling environment is in an appropriate mode, and the three-dimensional pointer is superimposed on an active object, the 3D pointer location is automatically constrained to the visible surfaces of that object (FIG. 2). When the pointer is moved so that it no longer visually overlaps an active object, it is de-constrained to become a free pointer 3D again (FIG. 1).

The dynamic surface-pointer can be implemented equally well using any of several position-detection and view projection algorithms. Any algorithms which provide appropriate position detection and view projection can support the functionality of the invention.

For example, a 3D ray casting along the line of sight through the pointer, a max/min comparison in 2D projected space between the pointer location and the object bounding shape, or other test can be used to mathematically detect for visual overlap of a 3D pointer with an object. When overlap is detected, the pointer is constrained to the object surface by an appropriate mathematical method. For instance, the object surface equation can be used as a set of allowed locations which can then be intersected with a line-of-sight ray through the 3D pointer location to yield a valid pointer location on the object surface. The overlap detection and 3D pointer location should be recomputed and re-displayed rapidly to provide dynamic, interactive tracking of the pointer movement in the object face.

Construction of three-dimensional computer models has become a valuable part of the design, construction, and manufacturing process in many fields. The efficiency of the modeling process has been restricted by the difficulty of accurately positioning modeling tools and model objects in three-dimensional space. This invention enhances the operation of three-dimensional modeling systems by providing fast and accurate positioning of pointers, tools, and objects in model space.

The space-jump provides instant rendezvous of a 3D pointer to a distant location in space. The dynamic surface pointer automatically positions a 3D pointer in space relative to active objects. This provides very efficient performance of certain modeling tasks, including but not limited to cutting (FIG. 3), 3D image-positioning, and feature-based or traditional boolean operations (FIG. 4).

These methods provide a novel economy of means to accomplish key functions. These economies are relevant to many fields in which three-dimensional computer models are used, from CAD/CAM to virtual reality environments.

Having illustrated and described the principles of the invention in a preferred embodiment, it should be apparent to those skilled in the art that the embodiment can be modified in arrangement and detail without departing from such principles. In view of the many possible embodiments to which the principles of my invention may be applied, it should be recognized that the illustrated embodiment is only a preferred example of the invention and should not be taken as a limitation on the scope of the invention. The invention is limited only by the following claims. I therefore claim as my invention all that comes within the scope and spirit of these claims.

I claim:

1. In a computer graphics modeling system, a method of accurately positioning a three dimensional pointer on a point of a three dimensional object shown on a display, the method comprising the following steps:

monitoring the position of a three dimensional pointer arbitrarily movable in two dimensions across the screen of the display;

receiving a signal from a user indicating that the pointer is two dimensionally coincident with a two dimensional projected view of a geometric point of the three dimensional object;

responsive to the signal, determining a third dimensional position of the geometric point; and moving the pointer to the three dimensional position of the geometric point.

2. The method of claim 1 wherein the received signal is generated by an input device responsive to user command.

3. The method of claim 1 wherein a geometric point is visibly different from non-geometric points of the object.

4. The method of claim 1 wherein the geometric point is a vertex of the object.

5. The method of claim 1 wherein the moving step comprises resetting the third dimensional position of the pointer to the third dimensional spatial coordinate of the geometric point.

6. The method of claim 1 wherein the moving step is responsive to the received signal.

7. The method of claim 1 wherein:

the determining step comprises determining the position of a nearest geometric point of a given set of geometric points; and the moving step comprises moving the pointer to the third dimensional position of the nearest geometric point.

8. A computer-readable medium on which is stored instructions for executing the steps of claim 1.

9. A computer graphics modeling system for accurately positioning a three dimensional pointer on a point of a three dimensional object shown on a display, comprising:

means for monitoring the position of a three dimensional pointer arbitrarily movable in two dimensions across the screen of the display;

means for receiving a signal from a user indicating that the pointer is two dimensionally coincident with a two dimensional projected view of a geometric point of the three dimensional object;

means responsive to the signal for determining a third dimensional position of the geometric point; and means for moving the pointer to the three dimensional position of the geometric point.

* * * * *